No. 883,787. PATENTED APR. 7, 1908.
T. CHRISTINE & F. H. BUDDE.
TREE SAWING MACHINE.
APPLICATION FILED APR. 29, 1907.
3 SHEETS—SHEET 1.
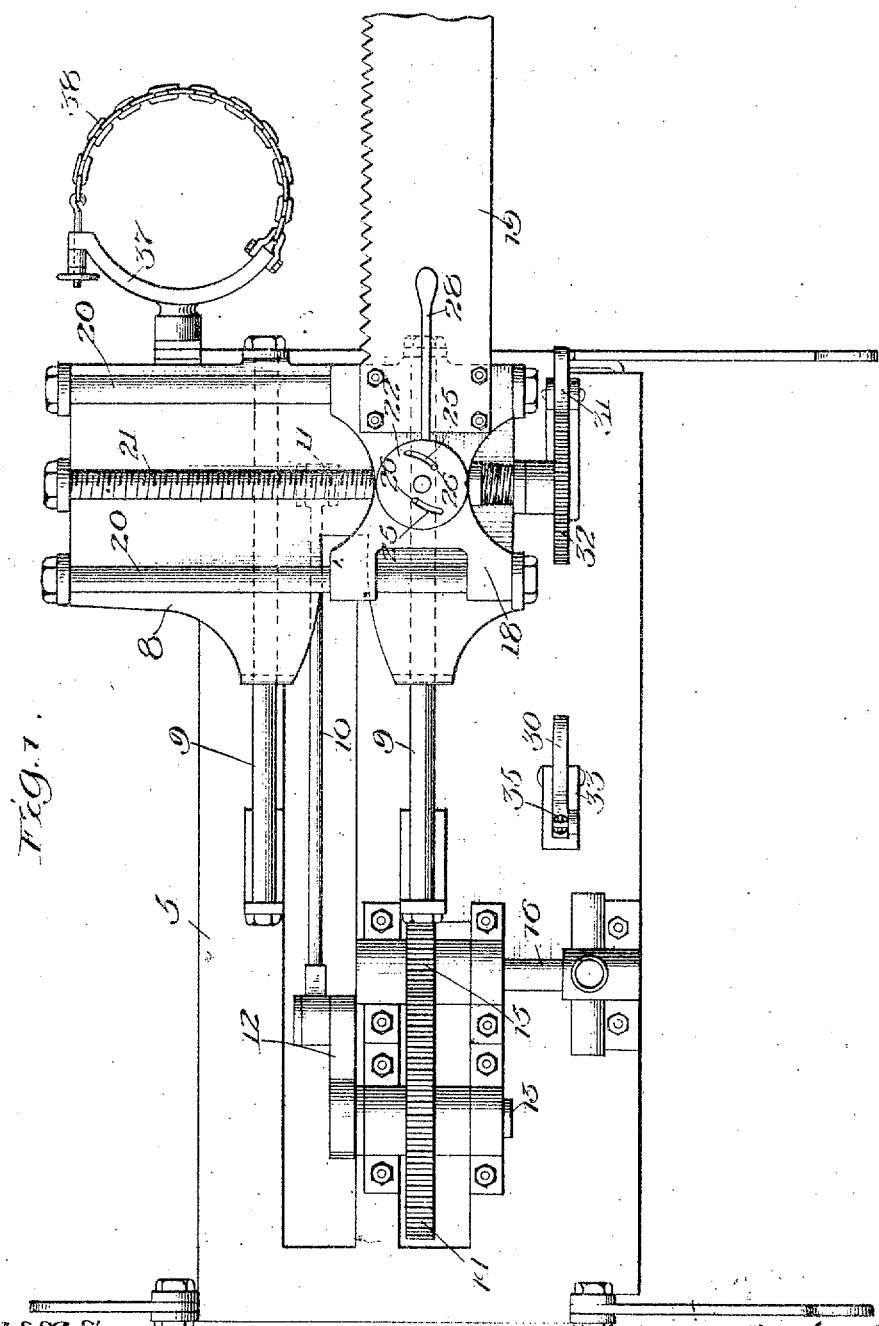

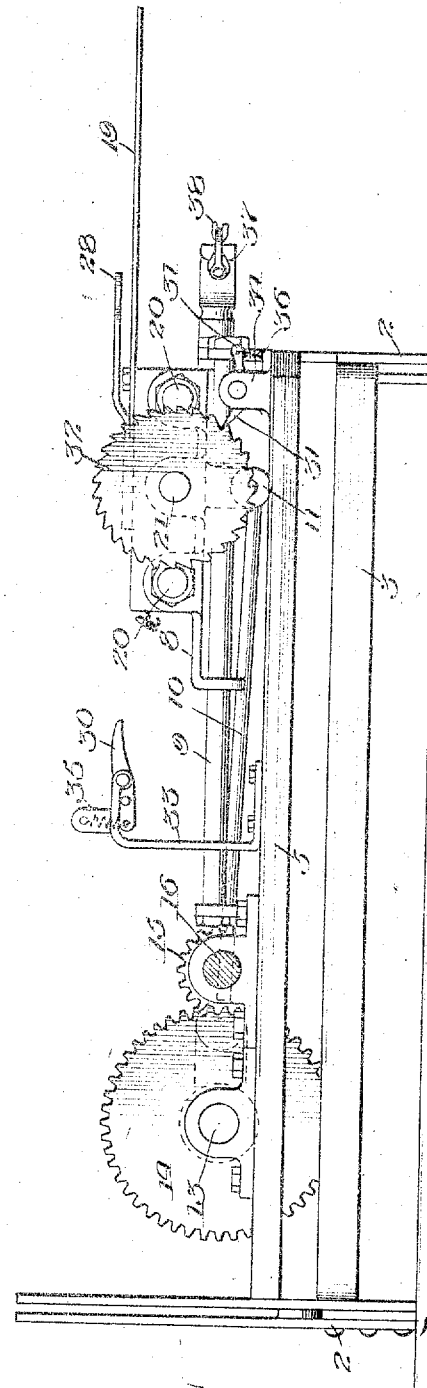

No. 883,787. PATENTED APR. 7, 1908.
W. T. CHRISTINE & F. H. BUDDE.
TREE SAWING MACHINE.
APPLICATION FILED APR. 29, 1907.
3 SHEETS—SHEET 3.
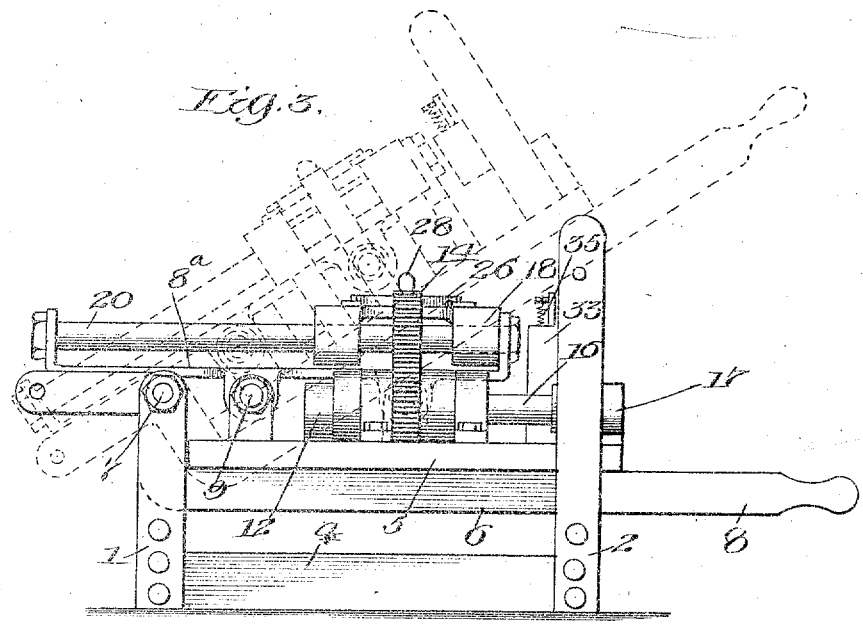
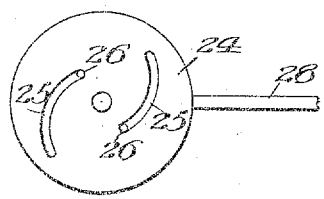
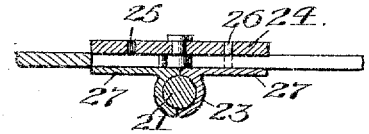
Witnesses:
Inventors
Wesley T. Christine
Fred H. Budde

UNITED STATES PATENT OFFICE.

WESLEY T. CHRISTINE, OF CHICAGO, AND FRED H. BUDDE, OF AURORA, ILLINOIS.

TREE-SAWING MACHINE.

No. 883,787.     Specification of Letters Patent.     Patented April 7, 1908.

Application filed April 29, 1907. Serial No. 370,791.

*To all whom it may concern:*

Be it known that we, WESLEY T. CHRISTINE and FRED H. BUDDE, citizens of the United States, residing, respectively, at Chicago and Aurora, in the counties of Cook and Kane and State of Illinois, have invented a certain new and useful Improvement in Tree-Sawing Machines, of which the following is a full, clear, concise, and exact description, reference being had to the accompanying drawings, forming a part of this specification.

Our invention relates to machines for cutting or sawing down trees; and its principal object is to provide a simple, practical and efficient form of machine for this purpose, which can be easily operated.

Another object is to arrange for making an under-cut, that is cutting out a wedge-shaped block on one side of the tree so as to cause the tree to fall on that side; also to allow the tree to be trimmed and cut after being felled.

Other objects of the invention are to provide simple and practical mechanism; to arrange for the easy adjustment and manipulation of the machine and its parts; and to accomplish the foregoing and other desirable results in a simple and expeditious manner.

In the machine which we show herein for carrying out our invention, we provide a suitable frame carrying a platform on which is mounted a saw and mechanism for operating the same. The saw-operating mechanism is arranged to feed or advance the saw step-by-step, so that the saw will be reciprocated back and forth to perform the sawing operation, and will also be advanced or fed forward to cut across the tree.

The platform on which the saw and its operating mechanism are mounted, is pivotally supported so as to permit it to be tilted into a horizontally inclined position, and the point of pivotal support is above the level of the platform, whereby when the tilting is performed, the saw will be elevated as well as inclined downwardly. This permits under-cutting. This is done by making two cuts,—a horizontal one with the platform in horizontal position, and an angular one with the platform in tilted position, the latter extending down to the horizontal cut so as to cut out a wedge-shaped block. Also, the saw can be adjusted to a vertical position to permit the tree to be trimmed and cut after being felled.

In the accompanying drawings, Figure 1 is a plan view of a tree-sawing machine embodying our invention; Fig. 2 is a side elevation of the same; Fig. 3 is an end view of said machine; and Figs. 4 and 5 are detail views.

Referring to the drawings, the machine shown is provided with a supporting frame conveniently formed of short uprights or legs 1, 1, and long legs 2, 2, side pieces 3, 3 and end pieces 4, 4. Upon the frame thus constructed, is mounted a platform 5 conveniently supported at its ends upon cross bars 6, 6. Each of these cross bars has its end bent twice (shown in Fig. 3), and a corner formed by such bending is pivoted at 7 at the tops of the short legs 1, while the remaining portion of such end piece 6 normally rests upon the corresponding end piece 4. A portion of said end pieces 6 project beyond the post 2 and form handles 8. Thus the platform 5 is provided with a tilting or pivotal connection by which it can be tilted into an oblique position horizontally, as shown by dotted lines in Fig. 3, and the points of pivotal support are above the normal position of the platform.

Upon the platform 5 there is mounted a reciprocating carriage 8ª arranged to reciprocate or slide lengthwise of the platform 5 upon guide rods 9, 9 secured at their ends to the platform 5. As an arrangement for reciprocating the carriage 8ª we have shown a driving rod 10 pivotally connected with the bottom of the carriage at 11 and connected with a crank 12 on a rotary shaft 13 carrying a gear 14 meshing with a pinion 15 on a rotary driving shaft 16. The shafts 13 and 16 are mounted in suitable bearings upon the platform 5. The drive shaft 16 is shown driven by an air engine or other suitable motor (not shown) which is mounted on the platform 5. Other drive arrangements, either power or hand, can be employed.

The reciprocating carriage 8ª carries a saw-holding carriage 18 which supports and carries a saw 19. This carriage 18 is mounted upon a pair of slide rods 20, 20 mounted transversely upon the reciprocating carriage 8ª and secured at their ends to the same. A rotary screw-shaft 21 is also mounted upon the reciprocating carriage 8ª and is engaged by a clutch device 22. This device conveniently consists of a separable sleeve 23 (Fig. 6) internally threaded so as to engage the screw-rod 21, and a disk 24 having slots 25 (Fig. 1) engaging pins 26. The pins 26 are secured to plates 27, 27 (Fig. 6) formed integral with the separable or divided sleeve 23, so that by turning the disk 22 the pins 26, 26 will be shifted so as to open and close the sleeve 23 and thereby cause the screw 21 to be engaged and disengaged. The disk 22 is provided with a handle 28 by which it can be operated.

Mounted upon the platform 5 are feed devices conveniently consisting of pivoted dogs 30, 31 adapted to engage a toothed wheel 32 mounted on the screw-shaft 21. The dog 30 is mounted upon a bracket 33 and the dog 31 upon a lug 34, and said dogs are subject to springs 35, 36 respectively. One of the short posts 1 is provided with a yoke 37 to which a chain 38 is secured for surrounding the tree to be sawed down.

In operation the machine is in effect tied to the tree which is to be sawed down, by the chain 38 as shown in Fig. 1, and then the saw is operated. The rotation of the driving shaft 16 causes the reciprocating carriage 8ª to work back and forth carrying the saw with it so as to effect the sawing operation. At each reciprocation however the toothed wheel 32 strikes against the dogs 30 and 31, thereby causing said wheel to turn intermittently and advance or feed the saw forwardly. Thus the saw works across the tree transversely to its direction of reciprocation.

When desired to make an under-cut in the tree to cause the tree to fall in a certain direction, a horizontal cut is made by sawing with the platform 5 in horizontal position, and then said platform is tilted up as shown in dotted position in Fig. 3, and an oblique cut made down to meet the horizontal cut and thereby cause a wedge-shaped block to be cut out of the tree. By pivoting the platform 5 above the level of said platform, the saw is raised and the oblique cut is made down to the horizontal cut. Whereas if the platform were pivoted in its own horizontal plane, the oblique cut would be made downward from the level of the horizontal cut and no block would be cut out.

When desired to set the saw, the clutch 22 can be disengaged and the saw moved to the proper position, and then the clutch 22 thrown into engagement with the screw-rod 21.

It will be understood that changes and modifications can be made without departing from the spirit of the invention.

What we claim is:—

1. A sawing machine comprising a reciprocating saw, and a platform carrying the same and pivotally mounted at points above the level of said platform.

2. A sawing machine, comprising a reciprocating saw, a platform on which the saw is mounted, and cross-pieces supporting said platform, said cross-pieces having portions extending upwardly above the platform with which pivotal connections are made.

3. A tree sawing machine comprising an angularly adjustable platform, a reciprocating carriage carried by said platform, a saw carrying carriage mounted for transverse movement upon said reciprocating carriage, a screw shaft carried by said reciprocating carriage and having a threaded engagement with said saw carrying carriage, and means for intermittently turning said screw shaft as the saw is reciprocated.

4. A tree sawing machine comprising an angularly adjustable platform, a reciprocating carriage mounted on said platform, means carried by the platform for reciprocating said carriage, a saw carrying carriage mounted for transverse movement upon said reciprocating carriage, a screw shaft carried by said reciprocating carriage, a movable threaded member carried by the saw carrying carriage and adapted to be moved into engagement with said screw shaft, and means for intermittently turning said screw shaft as the saw is reciprocated.

In witness whereof, we hereunto subscribe our names this 22d day of April A. D., 1907.

WESLEY T. CHRISTINE.
FRED H. BUDDE.

Witnesses:
 A. M. BELFIELD,
 1. C. LEE.